(12) United States Patent
Zettel et al.

(10) Patent No.: US 8,281,885 B2
(45) Date of Patent: Oct. 9, 2012

(54) METHOD AND APPARATUS TO MONITOR ROTATIONAL SPEEDS IN AN ELECTRO-MECHANICAL TRANSMISSION

(75) Inventors: Andrew M. Zettel, Ann Arbor, MI (US);
Charles J Van Horn, Novi, MI (US);
Peter E. Wu, Brighton, MI (US); Ryan D Martini, Royal Oak, MI (US);
Anthony H. Heap, Ann Arbor, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1056 days.

(21) Appl. No.: 12/233,485

(22) Filed: Sep. 18, 2008

(65) Prior Publication Data

US 2009/0118074 A1    May 7, 2009

Related U.S. Application Data

(60) Provisional application No. 60/985,743, filed on Nov. 6, 2007.

(51) Int. Cl.
*B60K 6/365* (2007.10)
(52) U.S. Cl. .................. 180/65.285; 180/65.28; 701/54
(58) Field of Classification Search ............... 180/65.28, 180/68.285, 65.1; 477/3, 5; 701/22, 54
See application file for complete search history.

(56) References Cited

U.S. PATENT DOCUMENTS

| | | | |
|---|---|---|---|
| 6,175,785 B1 * | 1/2001 | Fujisawa et al. ............... 701/22 |
| 6,430,483 B2 * | 8/2002 | Takaoka et al. ................. 701/22 |
| 6,595,895 B2 * | 7/2003 | Suzuki et al. ..................... 477/3 |
| 6,597,978 B1 * | 7/2003 | Dreibholz et al. .............. 701/51 |
| 6,823,954 B2 * | 11/2004 | Shimabukuro et al. ..... 180/65.25 |
| 6,832,148 B1 | 12/2004 | Bennett |
| 6,868,318 B1 | 3/2005 | Cawthorne |
| 6,893,380 B2 * | 5/2005 | Sauter .......................... 477/183 |
| 7,154,236 B1 | 12/2006 | Heap |
| 7,356,401 B2 * | 4/2008 | Romer et al. ................... 701/84 |
| 7,469,169 B2 * | 12/2008 | Dreibholz et al. .............. 701/22 |
| 7,524,265 B2 * | 4/2009 | Scelers ......................... 477/110 |
| 7,762,922 B2 * | 7/2010 | Dreibholz et al. ................ 477/5 |
| 8,041,489 B2 * | 10/2011 | Wegeng et al. ................. 701/67 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |

(Continued)

*Primary Examiner* — John Walters
*Assistant Examiner* — James Triggs

(57) ABSTRACT

A powertrain includes an electro-mechanical transmission mechanically-operatively coupled to an internal combustion engine and an electric machine to selectively transmit mechanical power to an output member. Powertrain operation includes monitoring operator inputs, and determining input speeds and changes in input speeds for the internal combustion engine and the electric machine. The input speeds are compared to threshold input speeds, and the changes in input speeds are compared to threshold changes in input speeds. Input torques of the internal combustion engine and the electric machine are reduced when any one of the input speeds and changes in input speeds exceeds the corresponding threshold.

7 Claims, 3 Drawing Sheets

U.S. PATENT DOCUMENTS

| | | | |
|---|---|---|---|
| 2005/0101437 A1* | 5/2005 | Wiethe et al. | 477/120 |
| 2005/0182526 A1 | 8/2005 | Hubbard | |
| 2005/0182543 A1* | 8/2005 | Sah et al. | 701/51 |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0194670 A1 | 8/2006 | Heap | |
| 2007/0078580 A1 | 4/2007 | Cawthorne | |
| 2007/0093953 A1 | 4/2007 | Heap | |
| 2007/0149348 A1 | 6/2007 | Holmes | |
| 2007/0191181 A1 | 8/2007 | Burns | |
| 2007/0207892 A1* | 9/2007 | Dreibholz et al. | 477/8 |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0246274 A1* | 10/2007 | Dreibholz et al. | 180/65.2 |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Zettel | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1* | 4/2009 | Heap et al. | 701/54 |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 | 5/2009 | Kaminsky | |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |
| 2009/0118090 A1 | 5/2009 | Heap | |
| 2009/0118091 A1 | 5/2009 | Lahti | |
| 2009/0118093 A1 | 5/2009 | Heap | |
| 2009/0118094 A1 | 5/2009 | Hsieh | |
| 2009/0118877 A1 | 5/2009 | Center | |
| 2009/0118879 A1 | 5/2009 | Heap | |
| 2009/0118880 A1 | 5/2009 | Heap | |
| 2009/0118882 A1 | 5/2009 | Heap | |
| 2009/0118883 A1 | 5/2009 | Heap | |
| 2009/0118884 A1 | 5/2009 | Heap | |
| 2009/0118885 A1 | 5/2009 | Heap | |
| 2009/0118886 A1 | 5/2009 | Tamai | |
| 2009/0118887 A1 | 5/2009 | Minarcin | |
| 2009/0118888 A1 | 5/2009 | Minarcin | |
| 2009/0118901 A1 | 5/2009 | Cawthorne | |
| 2009/0118914 A1 | 5/2009 | Schwenke | |
| 2009/0118915 A1 | 5/2009 | Heap | |
| 2009/0118916 A1 | 5/2009 | Kothari | |
| 2009/0118917 A1 | 5/2009 | Sah | |
| 2009/0118918 A1 | 5/2009 | Heap | |
| 2009/0118919 A1 | 5/2009 | Heap | |
| 2009/0118920 A1 | 5/2009 | Heap | |
| 2009/0118921 A1 | 5/2009 | Heap | |
| 2009/0118922 A1 | 5/2009 | Heap | |
| 2009/0118923 A1 | 5/2009 | Heap | |

| | | | | | | |
|---|---|---|---|---|---|---|
| 2009/0118924 A1 | 5/2009 | Heap | | 2009/0118944 A1 | 5/2009 | Heap |
| 2009/0118925 A1 | 5/2009 | Hsieh | | 2009/0118945 A1 | 5/2009 | Heap |
| 2009/0118926 A1 | 5/2009 | Heap | | 2009/0118946 A1 | 5/2009 | Heap |
| 2009/0118927 A1 | 5/2009 | Heap | | 2009/0118947 A1 | 5/2009 | Heap |
| 2009/0118928 A1 | 5/2009 | Heap | | 2009/0118948 A1 | 5/2009 | Heap |
| 2009/0118929 A1 | 5/2009 | Heap | | 2009/0118949 A1 * | 5/2009 | Heap et al. ............ 701/55 |
| 2009/0118930 A1 | 5/2009 | Heap | | 2009/0118950 A1 | 5/2009 | Heap |
| 2009/0118931 A1 | 5/2009 | Kaminsky | | 2009/0118951 A1 | 5/2009 | Heap |
| 2009/0118932 A1 | 5/2009 | Heap | | 2009/0118952 A1 | 5/2009 | Heap |
| 2009/0118933 A1 | 5/2009 | Heap | | 2009/0118954 A1 | 5/2009 | Wu |
| 2009/0118934 A1 | 5/2009 | Heap | | 2009/0118957 A1 | 5/2009 | Heap |
| 2009/0118935 A1 | 5/2009 | Heap | | 2009/0118962 A1 | 5/2009 | Heap |
| 2009/0118936 A1 | 5/2009 | Heap | | 2009/0118963 A1 | 5/2009 | Heap |
| 2009/0118937 A1 | 5/2009 | Heap | | 2009/0118964 A1 | 5/2009 | Snyder |
| 2009/0118938 A1 | 5/2009 | Heap | | 2009/0118969 A1 | 5/2009 | Heap |
| 2009/0118939 A1 | 5/2009 | Heap | | 2009/0118971 A1 | 5/2009 | Heap |
| 2009/0118940 A1 | 5/2009 | Heap | | 2009/0118999 A1 | 5/2009 | Heap |
| 2009/0118941 A1 | 5/2009 | Heap | | 2009/0144002 A1 | 6/2009 | Zettel |
| 2009/0118942 A1 | 5/2009 | Hsieh | | | | |
| 2009/0118943 A1 | 5/2009 | Heap | | | | |

\* cited by examiner

METHOD AND APPARATUS TO MONITOR ROTATIONAL SPEEDS IN AN ELECTRO-MECHANICAL TRANSMISSION

CROSS REFERENCE TO RELATED APPLICATIONS

This application claims the benefit of U.S. Provisional Application No. 60/985,743 filed on Nov. 6, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy potential that is storable in an electrical energy storage device. A control system monitors various inputs from the vehicle and the operator and provides operational control of the powertrain, including controlling transmission operating state and gear shifting, controlling the torque-generative devices, and regulating the electrical power interchange between the electrical energy storage device and the electric machines to manage outputs of the transmission, including torque and rotational speed.

SUMMARY

A powertrain includes an electro-mechanical transmission mechanically-operatively coupled to an internal combustion engine and an electric machine to selectively transmit mechanical power to an output member. Powertrain operation includes monitoring operator inputs, and determining input speeds and changes in input speeds for the internal combustion engine and the electric machine. The input speeds are compared to threshold input speeds, and the changes in input speeds are compared to threshold changes in input speeds. Input torques of the internal combustion engine and the electric machine are reduced when any one of the input speeds and changes in input speeds exceeds the corresponding threshold.

BRIEF DESCRIPTION OF THE DRAWINGS

One or more embodiments will now be described, by way of example, with reference to the accompanying drawings, in which.

DETAILED DESCRIPTION

Figure 1:
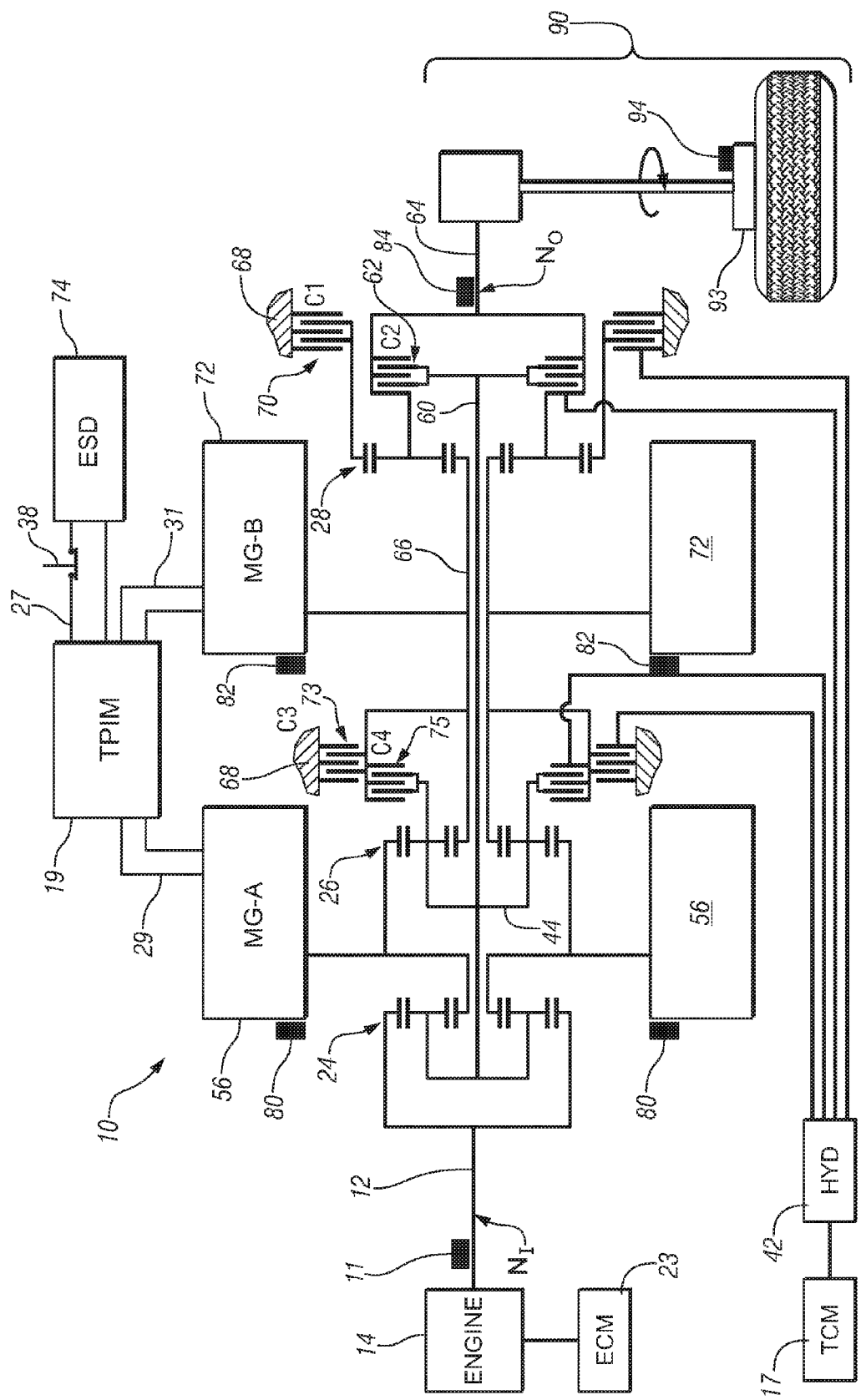
FIG. 1 is a schematic diagram of an exemplary powertrain, in accordance with the present disclosure.
Figure 2:
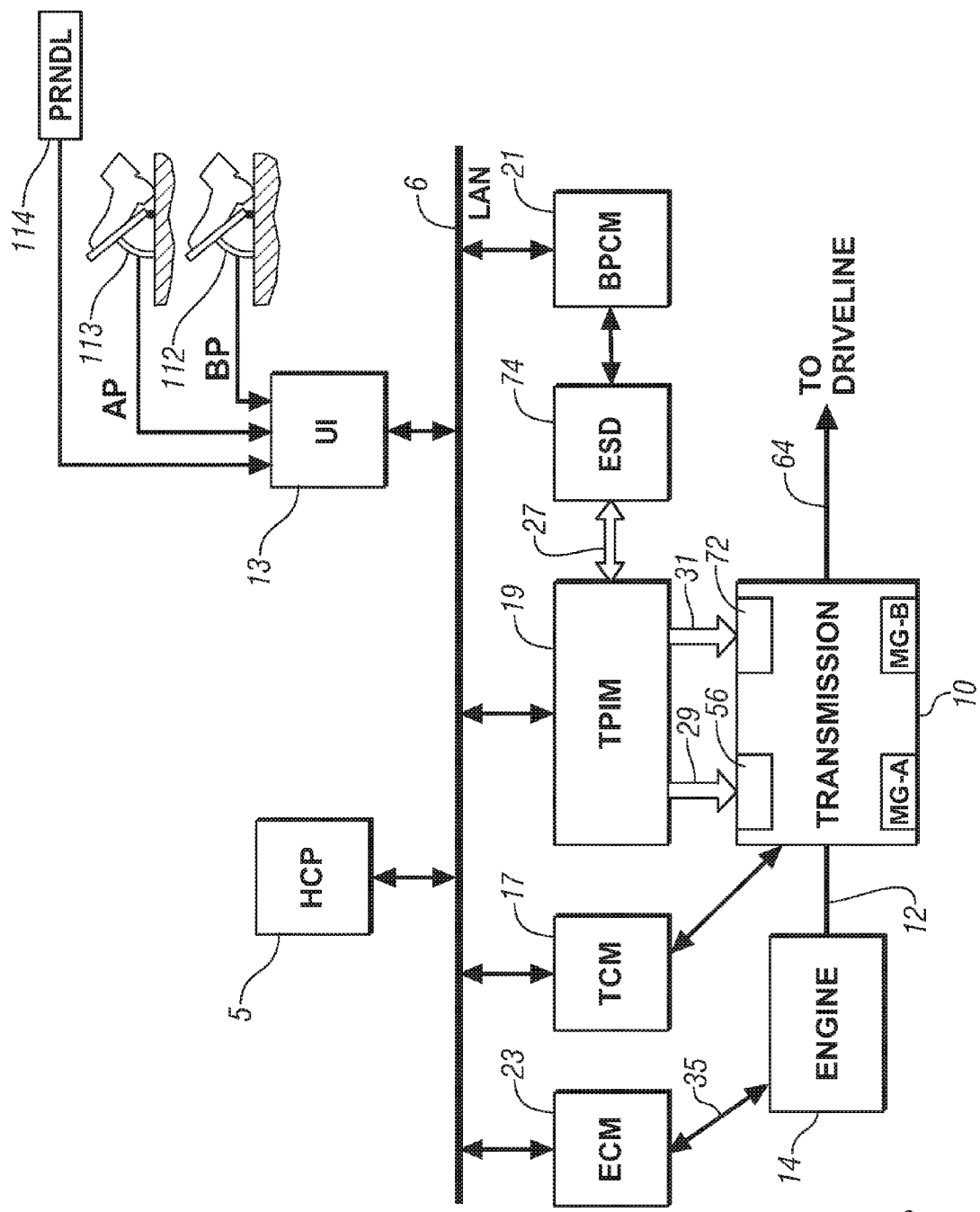
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, a method and control system for operating an electro-mechanical hybrid powertrain is described. FIGS. 1 and 2 depict an exemplary electro-mechanical hybrid powertrain which is operative to execute a control routine 100 described with reference to FIG. 3.

FIG. 1 schematically depicts the exemplary electro-mechanical hybrid powertrain embodying the concepts of the present disclosure, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and input speeds, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 comprise three-phase AC machines, each including a stator (not shown) and a rotor (not shown), and resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is attached to a sleeve shaft hub 66.

Each of the resolvers 80 and 82 comprises a variable reluctance device including a resolver stator (not shown) and a resolver rotor. The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors (not shown) are operatively connected to the rotor for the corresponding first and second electric machines 56 and 72. Each of the resolvers 80 and 82 is signally and operatively connected to a power inverter control module (hereafter 'TPIM') 19, and each senses and monitors rotational position of the resolver rotor relative to the resolver stator, thus monitoring rotational position of respective ones of first and second electric machines 56 and 72. The signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. An output speed sensor 84 monitors rotational speed and rotational direction of the output member 64. Each of the vehicle wheels 93, is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor safety switch 38. When the contactor safety switch 38 is closed, under normal operation, electric current can flow between the ESD 74 and the TPIM 19. When the contactor safety switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to the motor torque commands $T_A$ and $T_B$ for the first and second electric machines 56 and 72. Electrical current is transmitted to and from the ESD 74 in accordance with whether the ESD 74 is being charged or discharged.

The TPIM 19 includes the pair of power inverters (not shown) and respective motor control modules (not shown) configured to receive motor control commands and control inverter states therefrom for providing motor drive or regeneration functionality to achieve the motor torque commands $T_A$ and $T_B$. The power inverters comprise known complementary three-phase power electronics devices, and each includes a plurality of insulated gate bipolar transistors (not shown) for converting DC power from the ESD 74 to AC power for powering one of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 schematically depicts the distributed control module system. The elements described hereinafter comprise a subset of an overall vehicle control architecture, and provide coordinated system control of the powertrain described in FIG. 1. The distributed control module system synthesizes pertinent information and inputs, and executes algorithms to control various actuators to achieve control targets, including such parameters as fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and, a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock brakes, traction control, and vehicle stability. Multiple communications buses may be used to improve communications speed and provide some level of signal redundancy and integrity.

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request, a commanded output torque to the driveline 90, an engine input torque command, clutch torques for the torque-transfer clutches C1 70, C2 62, C3 73, C4 75 of the transmission 10; and the motor torque commands $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives commanded engine input torques from the HCP 5. The ECM 23 determines the actual engine input torques, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed $N_I$. The ECM 23 monitors inputs from sensors (not shown) to determine states of other engine operating parameters including, e.g., a manifold pressure, engine coolant temperature, ambient air temperature, and ambient pressure. The engine load can be determined from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include the estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory, random access memory, electrically programmable read only memory, a high speed clock, analog to digital and digital to analog circuitry, and input/output circuitry and devices and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the respective device, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | Continuously Variable Mode I | C1 70 | |
| MI_Eng_On | ON | Continuously Variable Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | Continuously Variable Mode II | C2 62 | |
| MII_Eng_On | ON | Continuously Variable Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table indicate which of the specific clutches C1 70, C2 62, C3 73, and C4 75 is applied for each of the operating range states. A first continuously variable mode, i.e., MI, is selected by applying clutch C1 70 to ground the outer gear member of the third planetary gear set 28. The engine state can be one of ON or OFF. A second continuously variable mode, i.e., MII, is selected by applying clutch C2 62 only to connect the shaft 60 to the carrier of the third planetary gear set 28. The engine state can be one of ON or OFF. For purposes of this description, when the engine state is OFF, the engine input speed is equal to zero revolutions per minute, i.e., the engine crankshaft is not rotating. A fixed gear operation provides a fixed ratio operation of input-to-output speed of the transmission 10, i.e., $N_I/N_O$, is achieved. A first fixed gear operation is selected by clutches C1 70 and C4 75. A second fixed gear operation is selected by clutches C1 70 and C2 62. A third fixed gear operation is selected by clutches C2 62 and C4 75. A fourth fixed gear operation is selected by clutches C1 70 and C3 73. The fixed ratio operation of input-to-output speed increases with increased fixed gear operation due to increased gear ratios in the planetary gears 24, 26, and 28. The input speeds of the first and second electric machines 56 and 72, $N_A$ and $N_B$ are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque intended to meet the operator torque request to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 to the user interface 13 as previously described.

The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
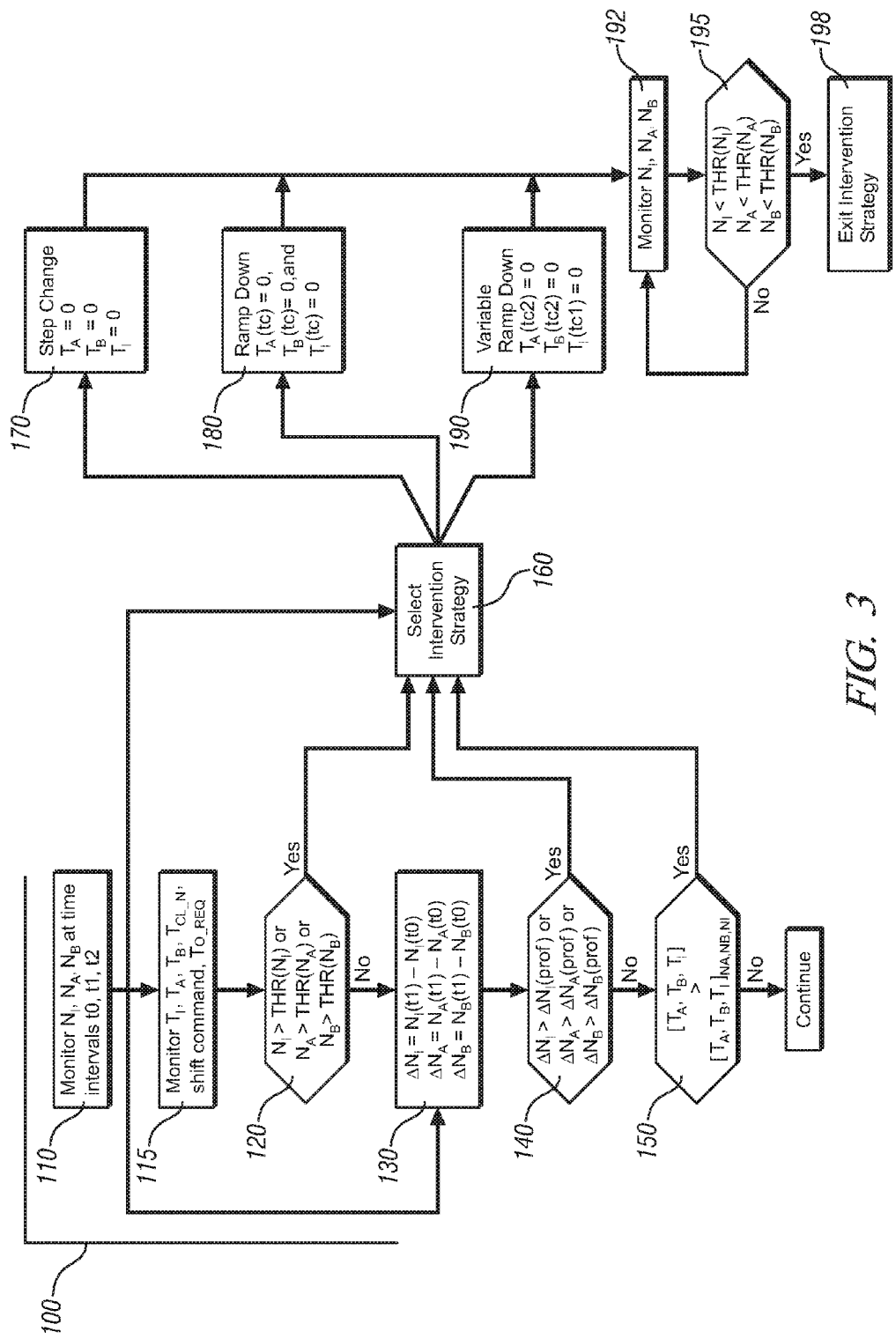
FIG. 3 is a flowchart, in accordance with the present disclosure.

FIG. 3 depicts the control routine 100 which operates the exemplary electro-mechanical hybrid powertrain, such as described hereinabove and with reference to FIGS. 1 and 2 and Table 1. The control routine 100 is reduced to program code which is stored in one of the memory devices of the HCP 5 and regularly executed by the HCP 5 during one of the preset loop cycles. In execution, the control routine 100 monitors the operator inputs and the power inputs from the engine 14 and the first and second electric machines 56 and 72 to the transmission 10 (110, 115). The monitored inputs are analyzed, and the analyzed results are compared to predetermined thresholds to detect an overspeed condition (120, 130, 140, 150). An intervention strategy is selected based upon the monitored inputs (160). The selected intervention strategy (170, 180, 190) is implemented upon detection of an overspeed condition to prevent mechanical harm to components of the exemplary electro-mechanical hybrid powertrain, including, e.g., the aforementioned shafts, clutches, and planetary gears, and to prevent operation in a manner unexpected by the operator. The intervention strategy preferably comprises controlling power flow between the torque-generative devices, i.e., the engine 14 and the first and second electric machines 56 and 72, and the transmission 10. The intervention strategy can be subsequently exited, depending upon the operating conditions and the specific intervention strategy (192, 195, 198).

An overspeed condition can occur due to presence of a fault in operation of one of the transmission 10, the engine 14 and the first and second electric machines 56 and 72, or a fault related to the components and systems described hereinabove, including in algorithmic program code and calibrations. A fault during ongoing operation may be diagnosed and addressed or may require off-line diagnosis and repair.

The control routine 100 monitors inputs at regular time intervals, shown as t0, t1, and, t2, preferably consistent with one of the preset loop cycles. The monitored inputs from the engine 14 and the first and second electric machines 56 and 72 to the transmission 10 preferably comprise the input speeds from the engine 14 and the first and second electric machines 56 and 72, i.e., $N_I$, $N_A$ and $N_B$ (110). Monitored inputs from the engine 14 and the first and second electric machines 56 and 72 to the transmission 10 further comprise the input torques from the engine 14 and the first and second electric machines 56 and 72, i.e., $T_I$, $T_A$, and $T_B$, and the clutch torques, referred to as $T_{CL\_N}$ for the clutches C1 70, C2 62, C3 73, and C4 75. Monitored operator inputs preferably comprise the accelerator pedal 113 and the brake pedal 112, from which the operator torque request is determined, and the transmission gear selector 114. The control routine monitors commands to execute a shift between the operating range states to determine whether a shift has been commanded and is being executed (115).

The control routine 100 analyzes the monitored inputs, which comprises determining changes in the monitored speeds. Determining the changes in speeds comprises determining a time-rate change in the input speeds of each of the engine 14 and the first and second electric machines 56 and 72. Thus, a change in the input speed ('$\Delta N_I$') is determined based upon a change in the input speed over an elapsed time, e.g., from time t0 to time t1, i.e., $\Delta N_I = N_I(t1) - N_I(t0)$. Similarly, a change in the input speed of the first electric machine 56 ('$\Delta N_A$') is determined based upon a change in the input speed over the elapsed time, i.e., $\Delta N_A = N_A(t1) - N_A(t0)$, and change in the input speed of the second electric machine 72 ('$\Delta N_B$') is determined based upon a change in the input speed over the elapsed time, i.e., $\Delta N_B = N_B(t1) - N_B(t0)$ (130).

The monitored inputs and the analyzed results are compared to predetermined thresholds to detect occurrence of an overspeed condition. A first comparison comprises comparing the input speeds from the engine 14 and the first and second electric machines 56 and 72 to threshold speeds from the engine 14 and the first and second electric machines 56 and 72, referred to as $THR(N_I)$, $THR(N_A)$ and $THR(N_B)$, to determine whether any one of the input speeds exceeds the corresponding threshold speed (120). The threshold speeds from the engine 14 and the first and second electric machines 56 and 72 preferably comprise maximum continuous sustainable input speeds for the respective device based upon mechanical and physical operating characteristics of the devices. An exemplary threshold speed for the engine 14 is 7000 RPM, and an exemplary threshold speed for the first and second electric machines 56 and 72 is 10,500 RPM, for purposes of the speed comparison. When any one of the input speeds exceeds the corresponding threshold speed, an intervention is requested and a specific intervention strategy is selected (160).

The changes in the input speeds from the engine 14 and the first and second electric machines 56 and 72 are compared to predetermined speed profiles, referred to as $\Delta N_I(prof)$, $\Delta N_A(prof)$, and $\Delta N_B(prof)$, respectively (140). The predetermined speed profiles for the engine 14 and the first and second electric machines 56 and 72 comprise maximum predicted changes in the speeds of the corresponding devices. Any change in speed exceeding the predetermined speed profiles indicates that the speed of the engine 14 or the speed of one of the first and second electric machines 56 and 72 is approaching the corresponding threshold speed. When any one of the changes in speeds exceeds the corresponding predetermined speed profile, an intervention is requested and a specific intervention strategy is selected (160).

The input torques from the engine 14 and the first and second electric machines 56 and 72 $T_I$ and $T_A$ and $T_B$ are compared to corresponding threshold input torques $[T_I, T_A, T_B]_{NI, NA, NB}$. The threshold input torques are determined for the engine 14 and the first and second electric machines 56 and 72 based upon the input speeds of the engine 14 and the first and second electric machines 56 and 72 $N_I$, $N_A$, and $N_B$. Other factors that can affect the threshold input torques include the aforementioned clutch torques, presence and stage of execution of a shift command, and the operator inputs to the accelerator pedal 113, the brake pedal 112 and the transmission gear selector 114 (150). When any one of the input torques $T_I$, $T_A$ and $T_B$ exceeds the corresponding threshold input torques, an intervention is requested and a specific intervention strategy is selected (160).

The intervention strategies comprise a plurality of control strategies to control mechanical power, preferably controlling the input torques $T_I$, $T_A$ and $T_B$ from the engine 14 and the first and second electric machines 56 and 72. The request for intervention and selection of an intervention strategy is based upon the input speeds of the engine 14 and the first and second electric machines 56 and 72, and is based upon the magnitude thereof in order to provide a system response which is appropriate to the overspeed condition as detected (160).

The intervention strategies include a torque shutoff strategy, a torque ramp-down strategy, and a selective torque ramp-down strategy. Each of the intervention strategies comprises reducing power flow from the engine 14 and the first and second electric machines 56 and 72 by adjusting the input torques, i.e., adjusting $T_A$, $T_B$, and $T_I$.

The torque shutoff strategy ('Step Change') (170) consists of a step-change reduction in power flow from the engine 14 and the first and second electric machines 56 and 72 to achieve zero-torque input to the transmission 10 with minimal delay. Torque commands for the engine 14 and the first and second electric machines 56 and 72 are set to zero, i.e., $T_1=0$, $T_A=0$, and $T_B=0$. The torque shutoff strategy can be implemented by cutting off electric power flow to the first and second electric machines 56 and 72 by opening the contactor safety switch 38 in the transfer conductors 27 between the ESD 74 and the TPIM 19, and commanding engine fueling to zero fuel. The torque shutoff strategy is preferably selected and implemented when the monitored input speed of either of the first and second electric machines 56 and 72 is substantially greater that the previously described maximum continuous sustainable input speeds. In the embodiment described, exemplary speeds for implementing the torque shutoff strategy comprises any one of the engine input speed exceeding 7500 RPM, or the input speed of either of the first and second electric machines exceeding 12,500 RPM.

The torque ramp-down strategy ('Ramp Down') (180) consists of implementing a time-based reduction in the power flow from the engine 14 and the first and second electric machines 56 and 72 to the transmission 10, leading to a zero-torque input to the transmission 10 within an elapsed time-certain (tc). The torque commands are commanded to ramp down, which preferably comprises the torque commands reduced by predetermined amounts during successive loop cycles such that the torque commands reach zero after the elapsed time-certain (tc), i.e., $T_A(tc)=0$, $T_B(tc)=0$, and $T_I(tc)=0$. The elapsed time-certain (tc) is preferably in the range of 0.5 to 1.0 seconds, and is calibratable. The torque ramp-down strategy is implemented by reducing electric power flow to the first and second electric machines 56 and 72 and reducing fueling rate to the engine. The torque ramp-down strategy is preferably implemented when the monitored input speed of either of the first and second electric machines 56 and 72 or the engine 14 is approaching the corresponding continuous sustainable input speed and the changes in the speeds of one of the inputs from the engine 14 and the first and second electric machines 56 and 72 is increasing and exceeding the corresponding speed profile.

The selective torque ramp-down strategy ('Variable Ramp Down') (190) consists of implementing time-based reductions in the power flow, i.e., the torque commands from the engine 14 and the first and second electric machines 56 and 72 to the transmission 10, with variations in the magnitudes of the time-based reductions in the input torques. The selective torque ramp-down strategy (190) reduces the input torques to the transmission 10 within elapsed times-certain, with a first elapsed time-certain (tc1) calibrated for the engine and a second elapsed time-certain (tc2) for both the electric machines 56 and 72. The torque commands are commanded to ramp down, with the torque commands reduced by predetermined amounts during successive loop cycles such that the torque commands reach zero after the times-certain (tc1) and (tc2), i.e., $T_I(tc1)=0$, $T_A(tc2)=0$, and, $T_B(tc2)=0$. The first elapsed time-certain (tc1) is preferably in the range of 0.5 to 1.0 seconds, and the second elapsed time-certain (tc2) is preferably in the range of 1.0 to 5.0 seconds, with both (tc1) and (tc2) being calibratable. The selective torque ramp-down strategy is implemented by reducing electric power flow to the first and second electric machines 56 and 72 and reducing fueling rate to the engine. The torque ramp-down strategy is preferably implemented when the monitored input speed of either of the first and second electric machines 56 and 72 or the engine 14 is approaching the corresponding continuous sustainable input speed and the changes in the speeds of one of the inputs from the engine 14 and the first and second electric machines 56 and 72 is increasing and approaching the corresponding speed profile.

The selected intervention strategy can be subsequently exited (198), with the commanded input torques, i.e., $T_A$, $T_B$, and $T_I$, restored to the torque commands existing prior to implementation of the intervention strategy. Exiting the intervention strategy depends upon the operating conditions and the specific intervention strategy implemented. The rotational speeds of the engine 14 and the first and second electric machines 56 and 72 $N_I$, $N_A$ and $N_B$ continue to be monitored during the executing of the selected intervention strategy (192). The selected intervention strategy is exited when the rotational speeds of the engine 14 and the first and second electric machines 56 and 72 $N_I$, $N_A$ and $N_B$ fall below predetermined thresholds (195). Preferably, the predetermined threshold speeds for exiting from the selected intervention strategy are based upon the previously described threshold speeds from the engine 14 and the first and second electric machines 56 and 72 $THR(N_I)$, $THR(N_A)$ and $THR(N_B)$. The threshold speeds $THR(N_I)$, $THR(N_A)$ and $THR(N_B)$ are each preferably reduced by a predetermined speed offset to introduce a hysteresis element. Alternatively, the selected intervention strategy can be exited after an elapsed period of time, e.g., 100 milliseconds (not shown).

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for controlling a powertrain comprising an electro-mechanical transmission mechanically-operatively coupled to an internal combustion engine and an electric machine to selectively transmit mechanical power to an output member, the method comprising:
   monitoring operator inputs;
   determining input speeds and changes in input speeds of the internal combustion engine and the electric machine;
   comparing the input speeds to threshold input speeds;
   comparing the changes in input speeds to threshold changes in input speeds; and, substantially immediately reducing input torques of the internal combustion engine and the electric machine to the transmission to zero torque when any one of the input speeds and the changes in input speeds exceeds the corresponding threshold.

2. The method of claim 1, further comprising subsequently discontinuing reducing the input torques of the internal combustion engine and the electric machine to the transmission when the input speeds are substantially less than the predetermined speed thresholds.

3. A method for controlling operation of a powertrain comprising an electro-mechanical transmission mechanically-operatively coupled to an internal combustion engine and first and second electric machines to transmit mechanical power to an output member, the method comprising:
   monitoring input speeds of the engine and the first and second electric machines;
   monitoring operations of the internal combustion engine and the first and second electric machines;
   determining input speeds and changes in input speeds for the internal combustion engine and the first and second electric machines;
   comparing the input speeds to threshold input speeds;
   comparing the changes in input speeds to threshold changes in input speeds; and
   substantially immediately reducing power outputs of the internal combustion engine and the first and second electric machines to zero power when any one of the input speeds and the changes in input speeds exceeds the corresponding threshold.

4. The method of claim 3, further comprising discontinuing reducing power outputs of the internal combustion engine and the first and second electric machines when the input speeds are less than the predetermined speed thresholds.

5. A method for controlling a powertrain comprising an electro-mechanical transmission mechanically-operatively coupled to an internal combustion engine and first and second electric machines to selectively transmit mechanical power to an output, the method comprising:
   monitoring operator inputs;
   monitoring operation of the internal combustion engine and the first and second electric machines;
   determining input speeds, changes in input speeds, and input torques for the internal combustion engine and the first and second electric machines to the transmission;
   comparing the input speeds to threshold input speeds;
   comparing the changes in input speeds to threshold changes in input speeds;
   comparing the input torques to threshold input torques;
   ramping down the input torques of the internal combustion engine and the first and second electric machines at varying ramp rates when any one of the input speeds, changes in input speeds, and input torques exceeds the corresponding threshold; and
   discontinuing the ramping down of the input torques from the internal combustion engine and the first and second electric machines when the input speeds are substantially less than the threshold input speeds.

6. The method of claim 5, comprising ramping down the input torques of the internal combustion engine and the first and second electric machines at varying ramp rates, said varying ramp rates determined such that the input torque of the internal combustion engine reaches zero after a first time-certain and the input torques of the first and second electric machines reach zero after a second time-certain.

7. The method of claim 5, further comprising ramping down the input torques of the internal combustion engine and the first and second electric machines over a predetermined duration when one of the input speeds, changes in input speeds, and input torques exceeds the corresponding threshold.

* * * * *